April 26, 1966

P. ESSINGER ETAL 3,248,699

NORMALIZING MULTILEVEL QUANTIZER

Filed Aug. 29, 1963

INVENTORS
PIERRE ESSINGER
EVON C. GREANIAS
BY Robert E. Sanelt
AGENT

United States Patent Office 3,248,699
Patented Apr. 26, 1966

3,248,699
NORMALIZING MULTILEVEL QUANTIZER
Pierre Essinger, Yorktown Heights, and Evon C. Greanias, Chappaqua, N.Y., assignors to International Business Machines Corporation, New York, N.Y., a corporation of New York
Filed Aug. 29, 1963, Ser. No. 305,255
6 Claims. (Cl. 340—146.3)

This invention relates to electrical waveform processing apparatus and more particularly apparatus for partitioning a time variant electrical waveform into predetermined fractional parts of the maximum amplitude excursions of the waveform.

While the invention will be described with respect to its use in the preferred environment of an apparatus for reading and identifying handwritten characters, it is adapted for use in any application wherein it is desired to partition a time variant waveform into proportionate parts of the maximum amplitude excursions of the waveform, and produce a sequence of signals, binary in nature, manifestive of the length of time that the waveform occupies each proportionate zone. Time varying waveforms such as seismograms, cardiograms, encephalograms, polygrams, magnetic survey records modulated communication waves, analog telemetering signals, and others, are all susceptible to processing by means of the instant invention. The zones into which the waveform is partitioned may be linearly distributed over the whole amplitude range or they may be non-linearly distributed in accordance with any predetermined relationship. For example, the zones may be closely spaced about the median of the waveform, and more widely separated at the amplitude extremes, or they may be conversely arranged. Whatever the arbitrary disposition of the zones may be, the unknown waveform, whose characteristics are to be analyzed, is first examined for the maximum positive and negative excursions. Voltages representing these maxima are stored, to provide reference voltages against which the instantaneous displacement voltages representing the unknown waveform are compared in a second examination of the waveform, to provide the zoning of the waveform into its proportionate amplitudes. Thus, all waveforms having the same time dependency but different amplitude magnifications will be normalized.

It is, therefore, an object of this invention to provide a normalizing apparatus for partitioning a time-variant electrical waveform into a plurality of zones, each of which bears a predetermined fixed relationship to the maximum amplitude excursions of the waveform.

A further object is to provide an electrical waveform analyzing apparatus for examining an electrical waveform for the maximum and minimum values thereof, storing voltages representing these values, dividing the thus stored values into voltage zones, and comparing the instantaneous displacements of the waveform against the voltages defining the zones, and producing signals manifestive of the successive zones in which waveform lies.

Another and more specific object is to provide an apparatus for processing time variant electrical waveform signals manifestive of the configuration of a pattern whose identity is sought to be recognized by a pattern recognition machine, and normalizing the pattern so as to allocate the succession incremental portions of the pattern to their proper relative positions in a matrix of predetermined dimensions.

A still further object is to provide an apparatus for producing data for processing in a character recognition machine indicative of the matrical disposition of the features of the character independent of the size thereof.

Yet another object is to provide a normalizing apparatus for a character recognition machine whereby the character is first scanned to determine its maximum horizontal and vertical dimensions, and measures of these dimensions stored as voltages, for division into voltage zones for comparison with voltages developed in subsequent scans to allocate the character portions to matrical positions in a predetermined matrix, independent of the character size.

The foregoing and other objects, features and advantages of the invention will be apparent from the following more particular description of a preferred embodiment of the invention, as illustrated in the accompanying drawings.

In the first curve of FIG. 3, a typical waveform representing any of the functions, hereinabove alluded to, is shown. This waveform might, for example, represent the Y displacement, as a function of time, of a cathode ray tube beam as it traces the outline of an imprinted character. Since the size of the character may vary, so also will the amplitude of the waveform represent its outline. If the recognition logic requires that the character be apportioned into zones, or adjusted to fit in a two-dimensional matrix, the utility of the apparatus to be hereinafter described becomes immediately apparent.

Figure 3:
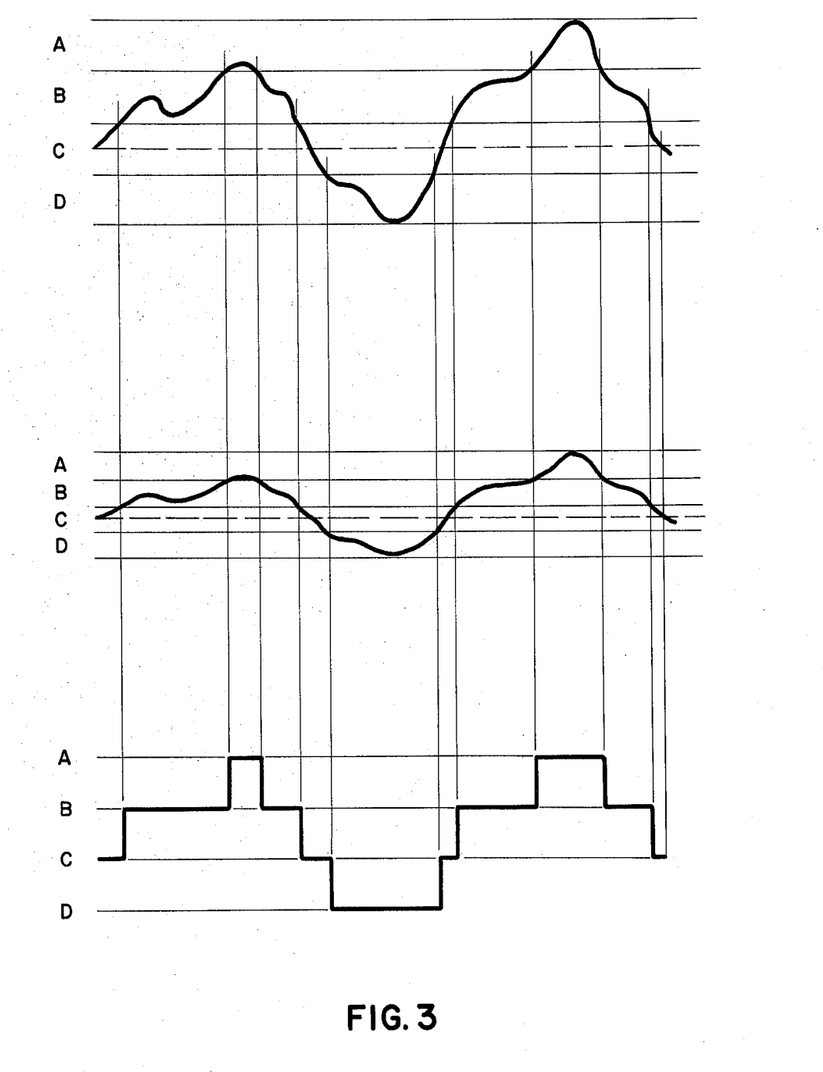
FIG. 3 shows typical waveforms upon which the circuit of FIG. 2 operates and the signal pattern derived therefrom.

In the second curve of FIG. 3 the same waveform, but with reduced amplitude, as that shown in the first curve is illustrated. This waveform would, in the example cited, represent the Y trace of the cathode ray tube beam in following the same character, but of lesser size. Since absolute size is not a recognition feature, it is desirable to standardize, or normalize, the character size so as to apportion its features into the appropriate zones. If only vertical zones are of interest, then processing the Y displacement voltages are sufficient. If a matrical disposition is required, both X and Y voltages will be processed and the maximum swing of each zoned to define the matrical position.

The zoning or apportioning is achieved by detecting the maximum positive and negative excursions on a first processing of the waveform, storing voltages representing these excursions, subtracting these stored voltages to obtain the swing, and dividing the difference voltage into proportional parts. During a second and subsequent processing of the same waveform, the instantaneous displacement of the waveform, manifested as a voltage, is compared with the voltages manifesting the proportionate parts, and signals developed indicating within which zone the instantaneous displacement occurs. Thus derived is a succession of binary-like signals indicating the duration of the waveform within each zone.

When either of the first or second waveforms of FIG. 3 is zoned in accordance with the principles of this invention, the distribution within the various zones yields the binary-like signals shown in the third trace in FIG. 3. The term "binary-like" has been employed to denote the presence or absence of a signal rather than a binary series employing the successive powers of two. These binary-like signals are indicated in FIG. 3 by pulses of appropriate length in each of the zones. With an output of this character, it is a matter of simple digital technology to reduce these signals to coded digital manifestations and to distribute them along a time base.

Thus, in the third line of FIG. 3, it will be seen that the succession of zones proceeds as follows:

CBABCDCBABC

If a time base were added, with fixed sampling periods, then the succession of zones will be the same, but the zone designations would be repeated for the requisite number of sampling periods for example, as follows:

CBBBABCDDCBBABC

A progression such as the foregoing is susceptible to recording in any of the various digital data storage apparatus.

In the preferred embodiment of the invention, the zonal distribution is made for both the X and Y directions so as to fit the character scanned into a 4 x 5 matrix. Except that time is the independent variable that correlates the matrical location with other characteristic functions that are generated by additional and independent processing of the X and Y displacement voltages, representing the character trace, the duration of zone occupancy is of no moment, and no attempt is made to digitize the zone signals or relate them to a time base.

Figure 1:
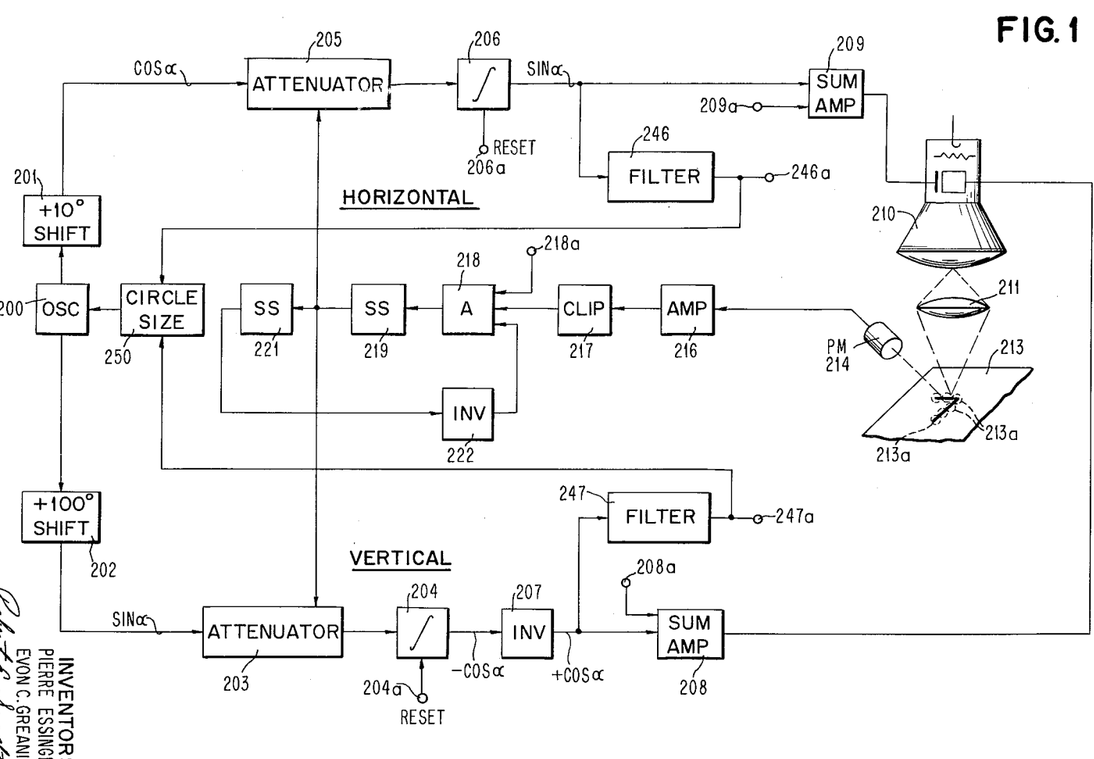
FIG. 1 shows an electronic curve follower for producing the waveforms for processing.

The apparatus for producing time variant signals (such as those shown in FIG. 3) manifestive of the outline of a character imprinted in opaque ink on a contrasting paper, which apparatus is known as a curve follower, is shown in FIG. 1.

The cathode ray tube 210 produces a controlled illuminated spot on the face of the tube, which spot is imaged through the lens 211 on the surface of the document 213 containing the characters to be followed and identified. One such character is shown and identified as 213a. The document 213 is contained in a light tight chamber and receives illumination solely from the cathode ray tube imaged spot. Thus, light reflected from the document 213 into the photomultiplier tube 214 will decrease and increase in intensity as the imaged spot passes into and out of the character. This difference in light intensity is amplified in the amplifier 216, the output from which controls the clipper 217 to yield a constant amplitude output response of fixed time duration only upon a change in the reflected light from light to dark. This change necessarily connotes that the imaged spot has passed from a white background area into the black of a character, and will be hereafter referred to as a hit.

The position of the beam on the face of the cathode ray tube 210 is controlled by conventional deflection plates, or a magnetic yoke from the voltages generated by the summing amplifiers 208 and 209. These amplifiers have search potentials applied to the terminals 208a and 209a by means, not shown, to initially position the tracing beam in close proximity to the character so as to enable the curve following to proceed. These search potentials might, for example, be generated by a pair of sawtooth waveform generators, whose phased outputs will produce a raster scan. Alternatively, the potentials could be supplied by manually controlled potentiometers to position the beam. As the search operation forms no part of this invention, the summing amplifiers 208 and 209 are added solely for the purpose of teaching where and how the search potentials could be introduced. In the curve following operation, the voltages applied to the terminals 208a and 209a are assumed to be fixed, and, therefore, the amplifiers 208 and 209 act merely as conventional power amplifiers.

The animation of the cathode ray tube beam originates in the variable amplitude oscillator 200 which produces a sinusoidal output waveform of substantially constant frequency, and an amplitude controlled by the magnitude of a control voltage produced by the circle size control 250. This sinusoidal output is phase shifted 10° positively in the phase shifter 201 and 100° positively in the phase shifter 202. The output waveforms from the phase shifters, therefore, differ by 90° in phase, and, therefore, define sine and cosine waveforms. Arbitrarily, therefore, the output from phase shifter 202 shall be referred to as the sine and that from the phase shifter 201 as the cosine. Two phase shifts with the difference of 90° are employed to obviate the difficulty of achieving an accurate 90° phase shift in a single shift.

The respective sine and cosine waveforms from the attenuators 202 and 201 normally pass through the attenuators 203 and 205 without any change in their amplitude. It is only when these attenuators receive a control potential from single shot 219 that they will attenuate the signals entered therein. The sine and cosine waveforms respectively are integrated in integrators 204 and 206 to yield waveforms respectively of $-\cos \alpha$ and $+\sin \alpha$ as is well known in integral calculus. Because it is desired that the beam rotate counter-clockwise, the $-\cos \alpha$ waveform is inverted by the inverter 207 to yield $+\cos \alpha$. With $+\cos \alpha$ entered in the summing amplifier 208 and $+\sin \alpha$ into amplifier 209, the cathode ray tube 210 will produce a circular beam trace, the diameter of which is proportional to the amplitude of the basic waveform.

Since the tracing beam has been initially positioned adjacent to the character 213a, the circular beam trace will at some point in its rotation intercept the black of the character. The photomultiplier 214 response, amplified in amplifier 216 will activate clipper 217 to yield an output pulse, passed by AND gate 218 to fire the single shot 219. The single shot 219 has the characteristic that, once it is energized by an enabling pulse, it will produce an output pulse of fixed duration and amplitude, independend of the firing pulse. The single shot 219 is so constructed that its output pulse continues for 180° of beam time. For the duration of the pulse output from the single shot 219, the potential, thus derived, causes the attenuators 203 and 205 to attenuate the respective waveforms entered therein. These attenuators are in effect, adjustable gain amplifiers whose gains are set at two different levels by the presence or absence of the potential set by the pulse output from the single shot 219. The attenuators 203 and 205, when they are activated by single shot 219, produce a small semicircular scan. Upon the cessation of the pulse output from single shot 219, the atenuators return to their initial state to provide the large circular scan, until the next hit is experienced.

Normally, the small semi-circular scan and the power of the lens 211 are of such magnitude that the small semi-circle traces entirely within the black of a character line. However, because of imperfections in print quality and line thickness, the small semi-circular scan may break out of and back into a character line. As a safety measure, therefore, when the pulse from the single shot 219 ceases, its cessation fires single shot 221 whose output, through the inverter 222 removes the enabling potential from AND 218 to prevent a spurious pulse from clipper 217 from prematurely refiring single shot 219. The duration of 30° (with respect to beam time) of the pulse from single shot 221 assures that the beam will exit from the line and resume its large circular trace without danger of refiring the single shot 219.

The additional terminal 218a to AND gate 218 is normally potentialized during the curve follower action to enable the gate to pass the pulses from clipper 217. If this terminal is depotentialized, the clipper pulses will be blocked and the follower action cannot proceed, as the beam will continue to maintain its large circular trace. This terminal 218a provides an effective beam blanking, which could not be achieved by grid action on the cathode ray tube 210. Were grid control employed, the photomultiplier tube 215 would be unable to distinguish a legitimate hit from the black return occasioned by conventional blanking. By depotentialization of this terminal, the integrators will be fed Sin $\alpha$ and Cos $\alpha$ of full amplitude continuously and will, therefore, accumulate no additional charge. The beam will, therefore, dwell with the circular dither of the larger circle. The arresting action of the hub 218a is useful when the beam is to be moved from character to character to prevent premature false following attempts while the beam is passing through one character to the next.

Since the curve follower is primarily designed to yield time variant voltages for analysis by recognition circuits whose purpose it is to identify the character traced, the filters 246 and 247 are provided. These filters receive the voltages produced by the integrators 206 and 204 (through inverter 207) and are tuned to pass only the slowly varying components thereof and ground the alternating current dither signal. The outputs 246a and 247a, therefore, represent the X and Y beam displacements as a function of time, and in fact, if connected to an oscilloscope, will produce a display which is visually recognizable as the character traced. It is these time variant X and Y voltages that are analyzed to achieve the recognition.

As was stated, the resolution of the scanning circles is proportioned to the size of the character. In the circuits of FIG. 1, this adjustment is shown schematically by the box 250 which feeds the oscillator 200. Although no details are shown in FIG. 1, it is sufficient to understand that the curve follower performs a first pass around the character, during which time the maximum voltage excursions occurring at the terminal 247a are stored as $+V_y$ max. and $-V_y$ max. The difference of these voltages is a measure of the character height. Since large characters require less resolution, a large difference between the two maximum voltages will produce an increase in the amplitude of the output waveform from the oscillator 200, and a small difference, a lesser amplitude waveform. This amplitude adjustment of the oscillator 200 occurs at the end of the first pass around the character and is effective for all subsequent passes.

Since it is desired to spread the character over a 4 x 5 matrix, the curve follower apparatus is first caused to pass once completely around the unknown character. The trace voltages appearing at the hubs 246a and 247a (FIG. 1) are received by the apparatus of FIG. 2a, where the positive and negative peak voltages representing the X and Y displacement are stored. These stored voltages then provide the frame of reference against which the voltages on the hubs 246a and 247a are compared in subsequent passes to provide signals indicating the passage of the tracing beam among the various matrix positions.

Figure 2A:
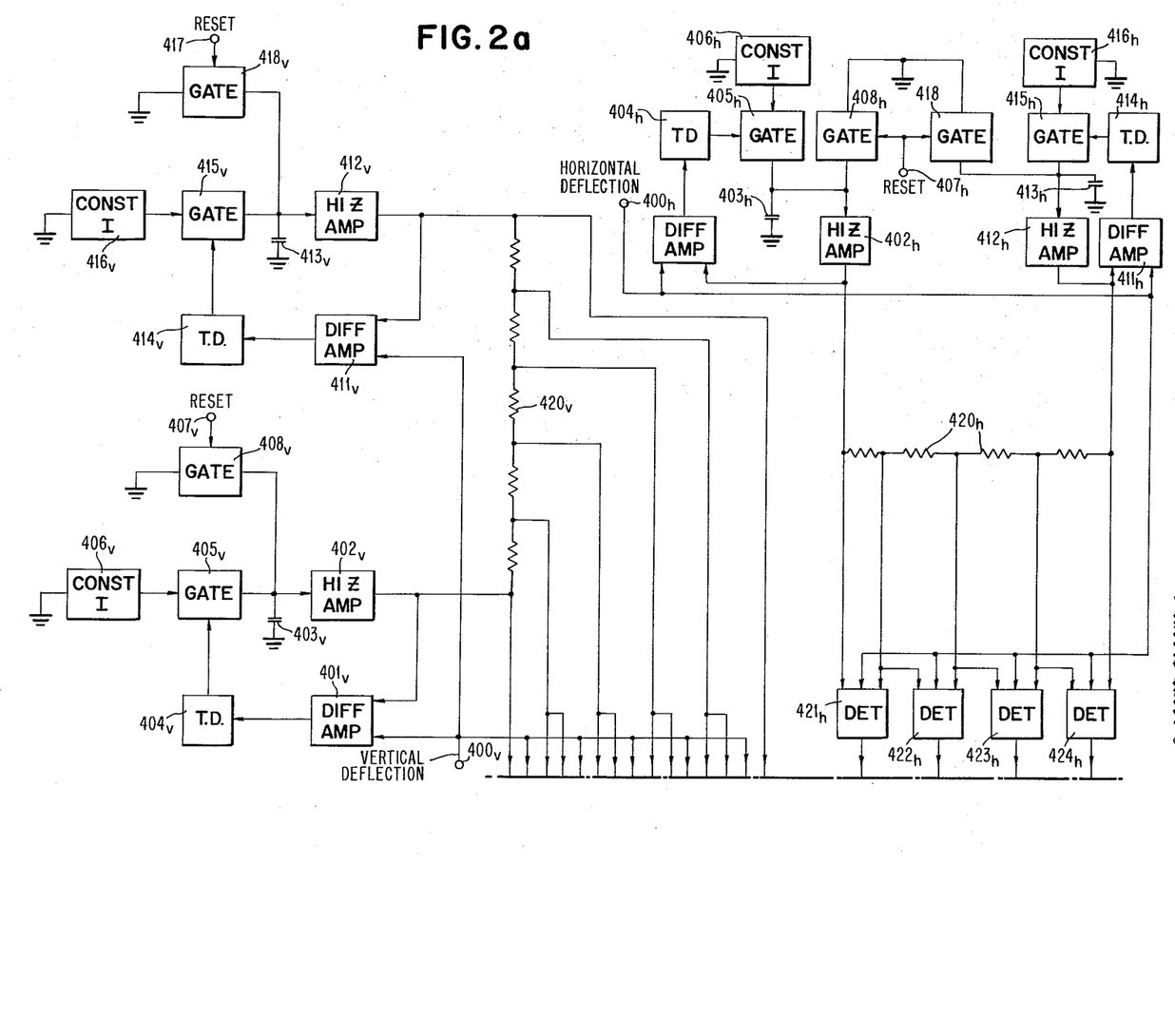
FIG. 2 shows the arrangement of FIGS. 2a and 2b which taken together show the normalizing and zone apportioning circuits for processing the time-variant waveforms produced by the apparatus of FIG. 1.

Specifically, and with reference to FIG. 2a, the horizontal deflection voltages appearing on the hub 246a are wired to the horizontal deflection hub $400_h$ of FIG. 2a, and the vertical deflection voltages on hub 247a wired to the vertical deflection hub $400_v$. Since both the horizontal and vertical circuits are identical, except for the number of zones, only the vertical deflection voltage processing circuits will be described. Correlation between the horizontal circuits is achieved by adding the subscripts "v" and "h" to the common reference numbers for the same component parts.

The time variant vertical deflection waveform, similar in nature to the waveforms of FIG. 3 applied to the hub $400_v$ during a first trace around the character, are applied to the difference amplifiers $401_v$ and $411_v$. These amplifiers each have two input connections and a single output connection, and produce an output voltage which is the difference between the voltages applied to the inputs. The amplifier $401_v$ processes negative voltages, and the amplifier $411_v$ processes positive voltages. The second inputs to each of the difference amplifiers is the output from the high impedance amplifiers $402_v$ and $412_v$, which amplifiers reproduce the voltage charge on the respective capacitors $403_v$ and $413_v$.

Since at the start of operation the capacitors $403_v$ and $413_v$ contain no voltage charge, the first occurrence of any potential on the hub $400_v$ will cause one of the difference amplifiers $402_v$ or $412_v$ to yield an output voltage, depending on whether the voltage is positive or negative. If the voltage is negative, the threshold detector $404_v$ will detect the negative departure from zero potential, yielding a signal having a constant amplitude independent of the magnitude of the input signal. This signal from the threshold detector $404_v$ opens gate $405_v$ to gate a charging current from the constant current source $406_v$ to charge the capacitor $403_v$ until its potential equals that of the input waveform at that instant. Should the initial potential of the input waveform be a positive-going one, the circuit for processing the positive voltages will respond in the manner just described, the similar active components having reference numerals ten greater than those whose action was just described.

The constant current source $406_v$, gate $405_v$, capacitor $403_v$, amplifier $402_v$, difference amplifier $401_v$, and threshold detector $404_v$, function as a sort of servo, in that the voltage charge on the capacitor $403_v$ will follow increasing negative excursions of the input waveform on the hub $400_v$. It differs from a servo, however, in that the capacitor $403_v$ will not lose charge to follow any decrease in the negative value of the input waveform. The capacitor $403_v$ therefore, stores the maximum negative excursion of the input waveform. If the whole of the waveform, constituting a complete pass around the character, has been presented to the hub $400_v$, then the capacitor $403_v$ will store a voltage which is a measure of the maximum vertical negative displacement of the bottom of the character traced. By analogy the capacitor $413_v$ will store a voltage measure of the top of the character.

During the time that the capacitors $403_v$ and $413_v$ are accumulating charges which measure the vertical dimensions of the character scanned, so also will the capacitors $403_h$ and $413_h$ be charged by the action of the horizontal deflection voltages to measure the maximum horizontal dimension of the scanned character. This charging action is directly analogous to that described for the vertical circuit, and by direct substitution of the reference numerals bearing an "h" subscript for those bearing the "v" subscript in the foregoing explanation the operation of the horizontal circuits will be apparent.

When the first pass around the character has been completed and the capacitors $403_v$, $413_v$, $403_h$, and $413_h$ store voltages representing the maximum displacement of the cathode ray tube beam in following the outline of the character, these voltages appear at the ends of the respective voltage dividers $420_v$ and $420_h$. The voltage divider $420_v$ is tapped so as to provide five equal resistive zones, corresponding to the five vertical matrix zones into which it is desired to fit the character. The voltage divider $420_h$ is divided into four zones, to produce with the vertical zones the desired 4 x 5 matrix. Since, except for the number of taps on the voltage dividers $420_v$ and $420_h$, the circuits are identical, again only the vertical circuits will be examined in detail.

On the second and all subsequent passes of the tracing beam around the character, the vertical deflection voltage will appear at the hub $400_v$ and is applied in parallel to all of the detectors $421_v$ to $425_v$ inclusive. Each of these detectors has two further input connections from the taps of the voltage divider $420_v$, such that each respective detector has voltage inputs defining the tapped voltage zones on the voltage divider. These detectors have the capability of comparing the instantaneous magnitude of the vertical deflection voltage on the hub $400_v$ with the zone-defining voltages applied as the remaining two inputs thereto, and producing a constant amplitude output signal so long as the deflection voltage is within the bounds of the zone.

The horizontal detectors $421_h$ to $424_h$, inclusive, provide signals in the same manner as their vertical counterparts representing the horizontal displacement of the tracing beam. The outputs from the horizontal detectors $421_h$ through $424_h$ are connected via the lines $531_h$ through $434_h$, respectively to the matrix of AND gates in FIG. 2b. So, too, are the outputs of the vertical detectors $421_v$ through $425_v$ connected to the same matrix via the lines $431_v$ through $435_v$. These horizontal and vertical lines are connected in the typical matrix array in FIG. 2b to the twenty AND gates A1 through D5, where the letter denotes the column and the numeral denotes the row. These AND gates may, for example, be diodes in a typical diode matrix, or any of many well-known circuits requiring the simultaneous presence of two inputs to produce an output.

Figure 2B:
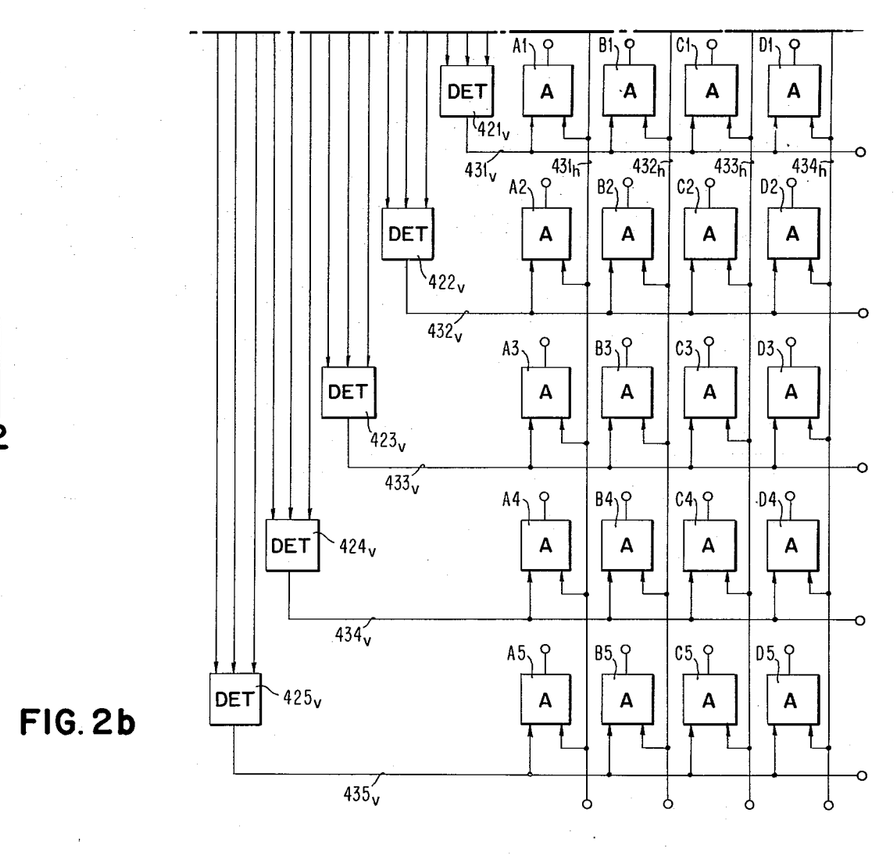

Thus, as the tracing beam follows the outline of the character, successive ones of the AND gates A1 through D5 will produce outputs indicating the path of the tracing beam through the normalizing matrix. These outputs will be independent of the character size, and thus be a function only of the character shape. The cardinal number "1," for example, when it is followed by a curve follower such as that shown in FIG. 1, will produce an output trace consisting of two closely spaced vertical parallel lines joined by circular arcs. The maximum vertical dimension of the trace will be the distance separating the horizontal tangents to the two arcs. The maximum horizontal dimension of the trace will be the distance separating the parallel vertical lines. This horizontal dimension will be expanded to fill four zones while the vertical dimension will be expanded, or contracted, to fill five zones. The matrix disposition of the trace will, therefore, energize the AND gates A1, A2, A3, A4, A5, B5, C5, D5, D4, D3, D2, D1, C1, B1, and A1 in that succession, assuming a counter-clockwise trace by the beam and an initial contact with the numeral at its upper left side.

When the curve follower of FIG. 1 has completed its recognition data-producing scans, and it is desired to proceed to identification of the next character, the normalizing circuits of FIG. 2 must be reset to destroy the size storage of the character whose identificaton has just been established. To this end, reset pulses are applied to the hubs $407_v$, $417_v$, and $407_h$ to cause the gates $408_v$, $418_v$, $408_h$, and $418_h$ to shunt the capacitors $403_v$, $413_v$, $403_h$, and $413_h$ to ground, thus destroying their storage of the size of the previous character. At the same time, reset pulses are applied to the hubs 204a and 206a of the integrators 204 and 206 (FIG. 1) to discharge their integrating capacitors in preparation for the following of the next character.

While the current sources $406_v$, $416_v$, $406_h$, and $416_h$ have been described as constant current sources, this term has been employed to denote that these sources are capable of producing a current which is substantially independent of the load applied thereto. Since the rate of change of the voltage charge on a capacitor is a function of the charging current, then, if the current is constant, the charging rate will be linear. Since neither the horizontal nor the vertical velocity component is constant, a linear charging rate is unnecessary. The servo type of charging circuit will gate charging current to the capacitors as necessary. The only requirement of the current sources is that they be capable of producing current having a value never less than that required to produce a rate of charge on the capacitors equal to the maximum slope of the voltage waveform representing the beam displacement. Since the maximum slope is either the maximum vertical or horizontal velocity of the beam, and the maximum beam velocity is a function of the frequency of the oscillator, the relative sizes of the overlapping circles, and the absolute sizes of these circles, the maximum velocity is readily susceptible to computation.

While reference has been made to a first or measuring pass around the character, and second and subsequent information passes around the character, little attention has been given to the controls for effecting these operations. However, once the curve follower apparatus of FIG. 1 is placed in close proximity to a character by application of controlled deflection voltages to the hubs 208a and 209a by searching circuits (not shown), the curve follower will continue to follow the outline of the character until it is stopped. Normally, the following action will cease when the recognition circuits either identify the character or have exhausted all of their routines and failed in recognition. Since the same character is being repeatedly scanned, the voltage charge on the capacitors is accumulated during the first pass around the character, and cannot accumulate any greater charge in subsequent passes. Therefore, the circuits for accumulating charge on the capacitors in FIG. 2 may be left in circuit during the second and subsequent passes, and will not yield any change in the charge on the capacitors after the first pass. It is only the recognition logic circuits that need receive signals indicative of the number of the scan. Since these circuits form no part of this invention, no means for keeping track of the number of scans has been shown. When the recognition logic circuits have determined that scanning shall cease with respect to any given character, they will provide the depotentializing control to AND gate 218 (via hub 218a) to stop the curve following action, initiate the search for the next character, and provide the reset pulses on the hubs 204a, 206a (FIG. 1) and on the hubs $407_v$, $417_v$, and $407_h$ (FIG. 2) to condition the normalizing circuits and the curve follower for following the next character when the hub 218a is repotentialized. The recognition logic will generate its own acceptance signals for the outputs from the AND gates A1 through D5, so as, for example, to ignore them on the first pass around the character.

While it has ben shown how the time variant waveforms generated by the curve following apparatus of FIG. 1 are processed by the normalizing and matrix apportioning circuits of FIG. 2, it will be readily apparent that any other time variant waveform may be applied to the hubs $400_v$ and $400_h$ to achieve the same matrix disposition. For one dimensional analysis of an unknown waveform, such as a cardiogram, only the vertical circuits of FIG. 2 need be used. So also may the taps on the voltage divider $420_v$ be increased, and distributed non-linearly in accordance with any desired function. These taps can be distributed according to a logarithmic or trigonometric function. Whatever the function may be, the separate signals on the lines $431_v$ to $435_v$ will provide the zonal distribution. These signals, as they presently appear, are in a quinary notation, but there is nothing to preclude their conversion to a binary, binary-coded decimal, or any other numeration system. With the addition of a time base, these coded signals then become directly available for digital processing. Thus, there is provided an analog-to-digital converter of amplitude relativity of a time-variant waveform.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for partitioning a recurrent time variant electrical waveform into predetermined proportionate parts of the difference between the maximum and minimum amplitude excursions of the waveform, comprising:
   (a) means operative upon a first occurrence of the waveform for storing a pair of voltages respectively manifestive of the maximum and minimum amplitude excursions of the waveform;
   (b) means operative upon subsequent occurrences of the waveform for deriving from said voltages a plurality of voltage levels each of which comprises a discretely different fractional part of the difference between the stored voltages;
   (c) and means operative during the subsequent occurrences of the waveform for continuously comparing a voltage manifestive of the instantaneous amplitude of said waveform with all of said voltage levels and producing a signal which discretely manifests the range in which the instantaneous amplitude falls, which range is defined by the said voltage levels.

2. Apparatus for normalizing the size of an imprinted character whose identity is sought to be established by the operation of a character recognition machine, comprising:
   (a) means for following the outline of the character in successive cycles of operation, and producing time variant voltages manifestive of the successive orthogonally related displacements of the character outline;
   (b) means operative upon a first trace of the character responsive to said time variant voltages for storing voltages respectively manifestive of the maximum and horizontal and the maximum vertical dimensions of the character;
   (c) means operative on traces of the character after said first trace under control of said stored voltages for producing a plurality of predetermined voltages measuring zones, the sum of which zones define the maximum horizontal and vertical dimensions of the character;
   (d) and means operative during traces of the character following said first trace for continuously comparing the horizontal and vertical displacement voltages with the voltages defining the zones and producing signals manifesting the successive zonal displacements of the character trace.

3. Apparatus for normalizing the size of an imprinted character whose identity is sought to be established in a character recognition apparatus, comprising:
   (a) means for successively scanning the character whose identity is sought, and producing time variant electrical waveforms manifestive of the configuration of the character scanned;
   (b) means operative on a first scan for storing manifestations of the maximum orthogonally disposed dimensions of the character;
   (c) means for dividing the stored manifestations into a plurality of sub-manifestations defining proportionate zonal parts of the maximum character dimensions;
   (d) means operative on scans successive to said first scan for comparing said time variant electrical waveforms with said sub-manifestations, and producing signals manifesting the orthogonal zonal distribution of the component parts of the configuration of the character.

4. Apparatus for normalizing the size of an imprinted character whose identity is sought to be established in a character recognition machine, and producing signals measuring the matrical distribution of the configuration of the character, comprising:
   (a) a curve following apparatus for following the outline of the character and producing first and second time variant voltage waveforms measuring the successive respective horizontal and vertical displacements of the character outline;
   (b) means operative on a first operation of said curve following apparatus for storing voltages equal to the maximum and minimum voltage excursions of said first and second waveforms;
   (c) first and second voltage dividing means connected between the means storing the maximum and minimum voltage excursions of said first and second waveforms, each of said voltage storage means having a plurality of taps operative to produce voltages defining zones within the voltage range defined by the stored maximum and minimum voltages;
   (d) and means operative during operations of said curve subsequent to said first operation thereof for continuously comparing said time variant waveforms with all of the voltages produced at the taps of the respective voltage dividing means and producing a pair of signals manifesting the horizontal and vertical zonal position of the instantaneous displacement of the curve following apparatus in tracing the outline of the character.

5. Apparatus for apportioning the fragmentary portions of an imprinted character whose identity is sought to be established by character recognition device, into relative positions in a normalized matrix comprising:
   (a) curve follower means for tracing the configuration of the character in successive cycles of operation and producing time variant waveforms manifestive of the successive orthogonal displacements of the character shape;
   (b) means, including two pairs of capacitors, operative during a first cycle of operation of said curve follower means for storing voltages respectively manifesting the maximum orthogonal excursion of said curve following means in tracing the configuration of said character;
   (c) a votlage divider having a predetermined number of taps thereon connected between each of said pair of condensers so as to divide the voltage difference on each said pair of condensers into predetermined horizontal and vertical voltage zones so as to provide a frame of reference to define a matrix;
   (d) voltage discriminators connected between each pair of successive taps on said voltage divider means, and having a further connection respectively to each of said time variant waveforms, the said voltage discriminators being operative to compare the instantaneous magnitude of the said waveforms with the voltages of said taps and producing an output manifestation when said waveform voltage has a magnitude between the voltages of the respective taps between which a given discriminator is connected.

6. Apparatus for apportioning the fragmentary portions of an imprinted character, whose identity is sought to be established in a character recognition device into a standard matrix having H columns and V rows comprising:
   (a) curve following means operative in successive cycle to trace the configuration of the character and produce a pair of time variant waveforms respectively manifesting the successive horizontal and vertical displacements of the trace;
   (b) a pair of horizontal voltage storing capacitors;
   (c) a pair of vertical voltage storing capacitors;
   (d) charging means for said horizontal voltage storing capacitors operative responsive to the waveform manifesting the successive horizontal displacements for charging the capacitors to voltage levels manifesting the maximum horizontal excursions of the trace;
   (e) charging means for said vertical voltage storing capacitors operative responsive to the waveform manifesting the successive vertcial displacements for discharging the capacitors to voltage levels manifesting the maximum vertical excursions of the trace;
   (f) a horizontal voltage divider having $H-1$ equally spaced taps thereon in addition to the terminal taps;
   (g) a vertical voltage divider having $V-1$ equally spaced taps thereon in addition to the terminal taps;
   (h) $H-1$ horizontal voltage discriminators each connected between a pair of successive taps, including the terminal taps, on said horizontal voltage divider, and having a common third connection to said horizontal voltage waveform, each operative continuously to compare the instantaneous magnitude of said waveform with the voltages produced by the respectively connected taps and produce an output response when the instantaneous voltage magnitude of said waveform lies between the voltages of the respective taps between which the discriminator is connected;
   (i) $V-1$ vertical voltage discriminators each connected between a pair of successive taps, including the terminal taps, on said vertical voltage divider, and having a common third connection to said vertical waveform, each operative continuously to compare the instantaneous magnitude of said waveform with the voltages produced by the respectively connected taps and produce an output response when the instantaneous voltage magnitude of said waveform lies between the voltages of the respective taps between which the discriminator is connected;

(j) a plurality of logical AND gates equal to the product of H and V each of which is connected to a different pair of said vertical and horizontal voltage discriminators;

whereby said AND gates will produce successive manifestations of the position of the curve follower in tracing the character as if the character traced were superimposed on a standard matrix of dimensions H by V to fill the matrix.

References Cited by the Examiner

UNITED STATES PATENTS 2,956,157  10/1960  Graham _____________ 328—14
3,189,873   6/1965  Rabinow _________ 340—146.3

RALPH G. NILSON, *Primary Examiner.*

MALCOLM A. MORRISON, *Examiner.*

J. D. WALL, *Assistant Examiner.*

UNITED STATES PATENT OFFICE
CERTIFICATE OF CORRECTION

Patent No. 3,248,699                                        April 26, 1966

Pierre Essinger et al.

It is hereby certified that error appears in the above numbered patent requiring correction and that the said Letters Patent should read as corrected below.

Column 6, line 71, for "$531_h$" read -- $431_h$ --; column 8, line 28, for "ben" read -- been --; line 44, for "preculde" read -- preclude --; column 10, line 56, "discharging" read -- charging --.

Signed and sealed this 28th day of Novmeber 1967.

(SEAL)
Attest:

Edward M. Fletcher, Jr.                                EDWARD J. BRENNER
Attesting Officer                                         Commissioner of Patents